US008925612B2

(12) United States Patent
Coto

(10) Patent No.: US 8,925,612 B2
(45) Date of Patent: Jan. 6, 2015

(54) ULTRASONIC COLLET HORN FOR ULTRASONIC WELDER

(71) Applicant: Branson Ultrasonics Corporation, Danbury, CT (US)

(72) Inventor: Guillermo Coto, Monroe, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 14/186,327

(22) Filed: Feb. 21, 2014

(65) Prior Publication Data

US 2014/0238615 A1     Aug. 28, 2014

Related U.S. Application Data

(60) Provisional application No. 61/768,719, filed on Feb. 25, 2013.

(51) Int. Cl.
*B32B 37/00* (2006.01)
*B23K 20/10* (2006.01)
*B29C 65/08* (2006.01)

(52) U.S. Cl.
CPC ............ *B23K 20/10* (2013.01); *B29C 65/08* (2013.01); *B23K 20/106* (2013.01); *B29C 65/085* (2013.01)
USPC ................................ 156/580.2; 156/580.1

(58) Field of Classification Search
USPC ......... 156/73.1, 580.1, 580.2; 228/1.1, 110.1; 425/174.2; 264/442, 443, 444, 445; 310/323.01, 323.18
See application file for complete search history.

(56) References Cited

U.S. PATENT DOCUMENTS

| | | | |
|---|---|---|---|
| 3,038,358 A | | 6/1962 | Jones |
| 3,464,102 A | * | 9/1969 | Soloff ......................... 156/580.2 |
| 3,754,310 A | * | 8/1973 | Shea ............................. 29/25.42 |
| 3,813,006 A | | 5/1974 | Holze, Jr. et al. |
| 6,612,479 B2 | * | 9/2003 | Popoola et al. ............. 228/110.1 |
| 6,691,909 B2 | * | 2/2004 | Skogsmo et al. ........... 228/111.5 |
| 7,748,590 B2 | * | 7/2010 | Reatherford et al. .......... 228/1.1 |
| 2006/0255091 A1 | | 11/2006 | Reatherford et al. | |

FOREIGN PATENT DOCUMENTS

JP     2007319870 A     12/2007

OTHER PUBLICATIONS

International Search Report and Written Opinion for PCT/US2014/018010, mailed Sep. 2, 2014.

* cited by examiner

*Primary Examiner* — James Sells
(74) *Attorney, Agent, or Firm* — Harness, Dickey & Pierce, P.L.C.

(57) ABSTRACT

An ultrasonic collet horn for an ultrasonic welder has a body and a collet over which a replaceable horn tip is receivable. The collet has a plurality of axial slits therein that divide the collet into sections and a tapered axially extending bore that tapers outwardly as it extends axially outwardly. The body has a threaded bore that is threadably engageable with a threaded inner section of a collet lock. The sections of the collet are forced outwardly against an inner wall of the horn tip when the horn tip is received on the collet and the collet lock tightened into the threaded bore to secure the horn tip on the collet.

5 Claims, 2 Drawing Sheets

ULTRASONIC COLLET HORN FOR ULTRASONIC WELDER

CROSS-REFERENCE TO RELATED APPLICATIONS

This application claims the benefit of U.S. Provisional Application No. 61/768,719, filed on Feb. 25, 2013. The entire disclosure of the above application is incorporated herein by reference.

FIELD

The present disclosure relates to ultrasonic welders, and more particularly, to a collet horn for ultrasonic welders.

BACKGROUND

This section provides background information related to the present disclosure which is not necessarily prior art.

A model of a typical ultrasonic metal welding apparatus 100 is shown in FIG. 1. Typical components of ultrasonic metal welding apparatus 100 include an ultrasonic transducer 102, a booster 104, and an ultrasonic horn 106. As is commonly understood by those of skill in the art of ultrasonic welding, an ultrasonic horn is a metal bar that transfers mechanical energy from the ultrasonic transducer to the work piece. The ultrasonic horn is typically one-half wavelength long at the resonant frequency at which the ultrasonic transducer driving the horn resonates. Electrical energy from a power supply 101 at a frequency of 20-60 kHz is converted to mechanical energy by the ultrasonic transducer 102. The mechanical energy converted in the ultrasonic transducer 102 is transmitted to a weld load 108 (such as two pieces of metal 112, 114) through the booster 104 and the horn 106. The booster 104 and the horn 106 perform the functions of transmitting the mechanical energy as well as transforming mechanical vibrations from the ultrasonic transducer 102 by a gain factor.

The mechanical vibration that results on a horn tip 110 is the motion that performs the task of welding metal together. Horn tip 110 may be made of tungsten carbide or other high strength, hard material. The metal pieces 112, 114 to be welded together are placed adjacent to the horn tip 110. The horn tip 110 is brought into contact with top metal piece 112 to be welded. In the embodiment of FIG. 1, horn 106 includes two horn tips 110, one of which is brought into contact with top metal piece 112. The axial vibrations of the horn 106 now become shear vibrations to the top metal piece 112. The shear vibrations are transmitted to the top metal piece 112, causing it to move back and forth with respect to bottom metal piece 114 causing surfaces of the two metal pieces abutting each other at a weld interface to be heated, eventually melting together. A weld anvil 120 grounds the bottom metal piece 114. It should be understood that such an ultrasonic welder can be used to weld multiple metal foil layers together, such as several layers of aluminum or copper foil.

A similar apparatus is used in ultrasonically welding plastic pieces together. The principal difference is that the ultrasonic horn oscillates in a manner to impart vertical oscillations in the plastic pieces. That is, the ultrasonic horn causes oscillatory compression/decompression of the plastic pieces with respect to each other causing surfaces of the plastic pieces abutting each other at a weld interface to be heated, eventually melting together.

Ultrasonic welders are for example disclosed in U.S. Pat. No. 5,658,408 for Method for Processing Workpieces by Ultrasonic Energy;" U.S. Pat. No. 6,863,205 for Anti-Splice Welder," and U.S. Pat. Pub. No. 2008/0054051 for "Ultrasonic Welding Using Amplitude Profiling." The entire disclosures of the foregoing are incorporated herein by reference.

Ultrasonic horns are key components of ultrasonic welders. In ultrasonic welding of metal and plastic films and fabric, ultrasonic horns are a wear item in that the tip of the ultrasonic horn that contacts the work piece being welded wears over time. This requires that the ultrasonic horn be periodically replaced, which adds cost to the ultrasonic welding process since ultrasonic horns are relatively expensive components. To reduce this cost, certain ultrasonic horns have replaceable tips. One type of replaceable tip has an outer contact portion and a threaded stud extending therefrom that is tightened into a threaded bore in the end of the ultrasonic horn to secure the replaceable tip to the ultrasonic horn. In another type, the end of the ultrasonic horn has a stud projecting outwardly therefrom over which the replaceable tip fits. An end portion of the stud is threaded and a front nut is then tightened on the threaded end portion the stud against a front surface of the replaceable tip to secure the replaceable tip to the end of the ultrasonic horn.

SUMMARY

This section provides a general summary of the disclosure, and is not a comprehensive disclosure of its full scope or all of its features.

An ultrasonic collet horn for an ultrasonic welder includes a collet projecting axially outwardly at an end of a body of the ultrasonic collet horn. In an aspect, the collet projects outwardly from a shoulder of the ultrasonic collet horn. The collet has a plurality of axial slits therein that divide it into sections and a tapered axially extending bore that tapers outwardly as it extends axially outwardly from the shoulder of the ultrasonic collet horn. The ultrasonic collet horn includes a threaded bore that extends axially inwardly from the end of the body from which the collet projects. In an aspect, the threaded bore extends axially inwardly from the shoulder of the ultrasonic collet horn. The collet of the ultrasonic collet horn receives a replaceable horn tip that is placed over the collet and against the shoulder of the ultrasonic collet horn. A collet lock having a threaded inner section and a tapered outer section is threadably tightened in the threaded bore of the ultrasonic collet horn. As the collet lock is tightened in the threaded bore of the ultrasonic horn, the tapered outer section of the collet lock forces the sections of the collet outwardly against an inner wall of the replaceable horn tip that surround a bore of the replaceable horn tip securing the replaceable horn tip on the collet and to the ultrasonic collet horn.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
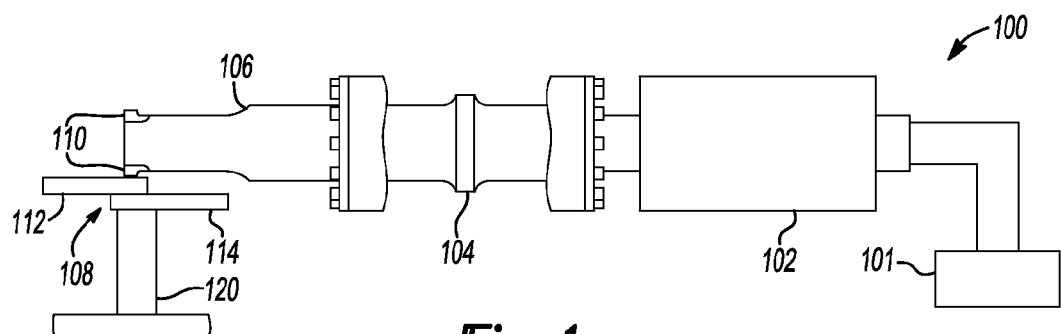
FIG. 1 is schematic view of a prior art ultrasonic welder.
Figure 2:
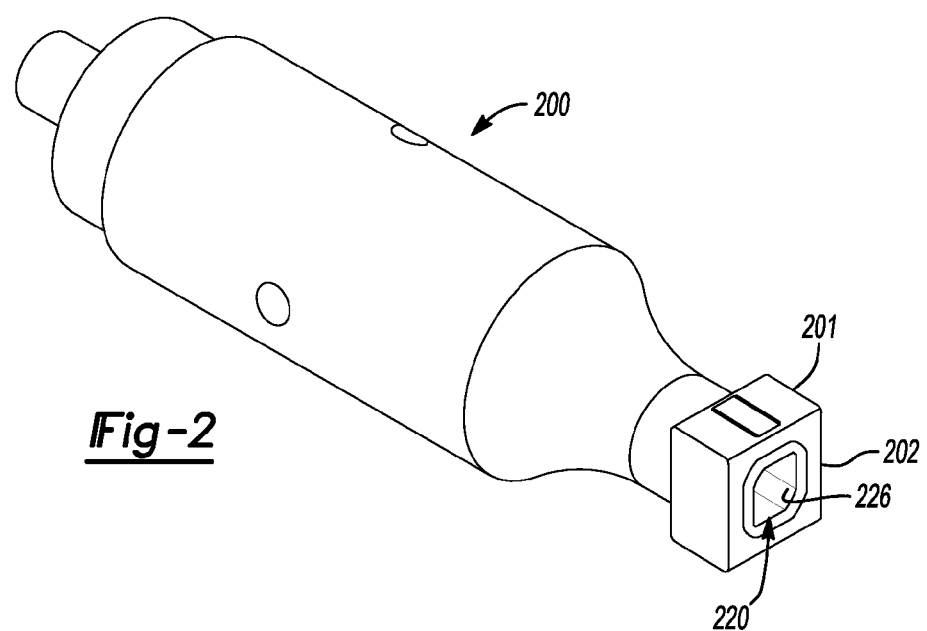
FIG. 2 is perspective view of an ultrasonic collet horn in accordance with an aspect of the present disclosure with a replaceable horn tip secured to a collet of the ultrasonic collet horn.
Figure 3:
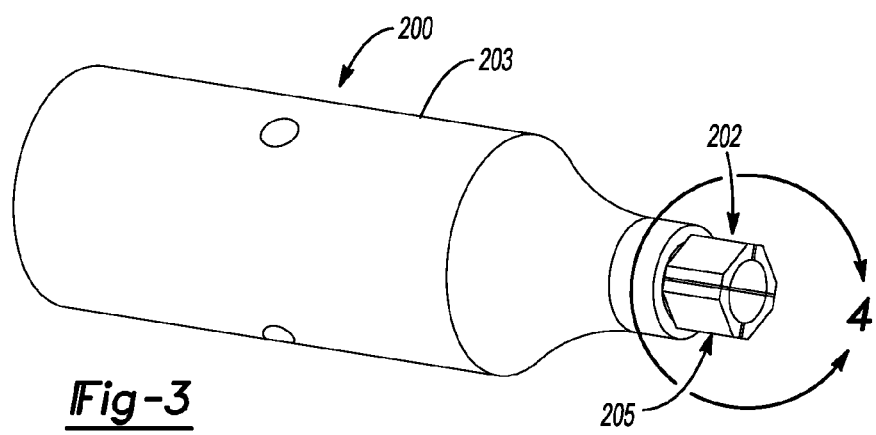
FIG. 3 is a perspective view of the ultrasonic collet horn of FIG. 2 without the replaceable horn tip secured to the collet.
Figure 4:
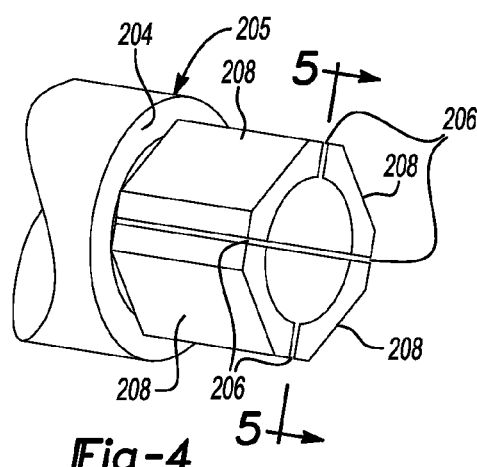
FIG. 4 is a perspective view of an end portion of the ultrasonic collet horn of FIG. 3 designated by area 4 in FIG. 3.
Figure 5:
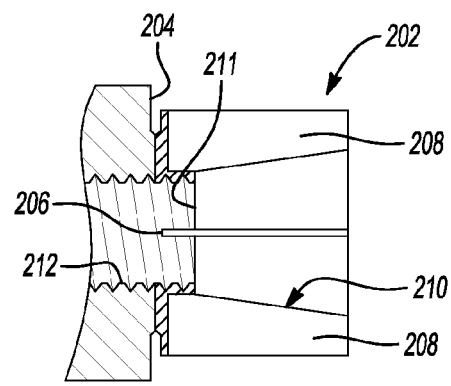
FIG. 5 is a section view of the end portion shown in FIG. 4 of the ultrasonic collet horn of FIG. 3 taken along the line 5-5 in FIG. 4.

FIG. 2 shows an ultrasonic collet horn 200 and replaceable horn tip 201 secured to collet 202 (FIG. 3) of ultrasonic collet horn 200. FIG. 3 shows ultrasonic collet horn 200 without replaceable horn tip 201 secured to collet 202. Collet 202 projects axially outwardly at an end 205 of a body 203 of ultrasonic collet horn 200, such as from shoulder 204 (FIG. 4) of ultrasonic collet horn 200 at a junction of end 205 of body 203 and an axial inner end 207 of collet 202. As best shown in FIG. 4, collet 202 has a plurality of axially extending slits 206 that split collet 202 into a plurality of sections 208. Illustratively, collet 202 has four axial slits 206 arranged equidistantly around collet 202 splitting collet 202 into four sections 208. As best shown in FIG. 5, collet 202 has a tapered axially extending bore 210 therein that tapers radially outwardly as bore 210 extends axially outwardly. That is, a diameter of bore 210 gradually increases as bore 210 extends axially outwardly. Body 203 of ultrasonic collet horn 200 includes a threaded bore 212 that extends axially inwardly from an axial inner end 211 of bore 210. In an aspect, threaded bore 212 also extends partially into collet 202. It should be understood that all of threaded bore 212 need not be threaded. Collet 202 may illustratively have a generally square outer cross-section with chamfered edges split by the axial slits 206. It should be understood that collet 202 can have an outer cross-section that is other than square with chamfered edges. For example, collet 202 can have a polygonal cross section with chamfered edges where the polygon is other than a square. Collet 202 could also have a circular cross-section.

Figure 6:
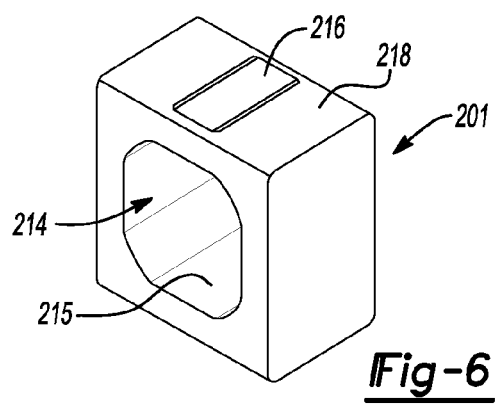
FIG. 6 is a perspective view of a replaceable horn tip.

FIG. 6 shows replaceable horn tip 201 in more detail. Replaceable horn tip 201 has an inner bore 214 defined by inner wall 215 of replaceable horn tip 201 surrounding inner bore 214. Inner bore 214 has a cross-section that conforms to the outer cross-section of collet 202. Replaceable horn tip 201 illustratively has a square outer cross-section as shown in FIG. 6. It should be understood, however, that the outer geometry of replaceable horn tip 201 can be other than square and can be the geometry that is appropriate for the application for which replaceable horn tip 201 is used. Replaceable horn tip 201 may include one or more contact surfaces 216 disposed as shown in the example of FIG. 6 on outer sides 218 of replaceable horn tip 201. Contact surface 216 may for example be a knurled surface. It should be understood that the contact surface or surfaces could be disposed on other portions of replaceable horn tip 201, such as a front face of replaceable horn tip 201.

Figure 7:
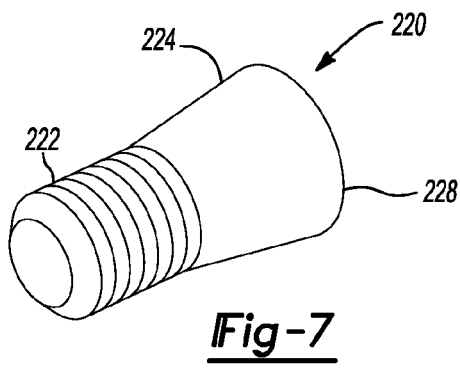
FIG. 7 is a perspective view of a collet lock in accordance with an aspect of the present disclosure.

FIG. 7 shows a collet lock 220 that is used to secure replaceable horn tip 201 to ultrasonic collet horn 200. Collet lock 220 can be considered a shaped bolt having an externally threaded inner section 222 and a tapered outer section 224 that tapers radially outwardly from threaded inner section 222. Tapered outer section 224 may have a tool receiving feature 226 (FIG. 2) in an outer end 228 (FIG. 7) into which a fastening tool (not shown) can be inserted to facilitate tightening of collet lock 220 as described below. Tool receiving feature 226 may illustratively be a hex slot for receiving an Allen wrench, but it should be understood that it could be other than a hex slot.

To assemble replaceable horn tip 201 to ultrasonic collet horn 200, replaceable horn tip 201 is placed on collet 202 and up against shoulder 204 of ultrasonic collet horn 200. Collet lock 220 is then inserted into bore 210 of collet 202 and threaded inner section 222 threaded into threaded bore 212 of ultrasonic collet horn 200 and tightened. Threaded inner section 222 is illustratively a threaded shaft. As collet lock 220 is tightened, tapered outer section 224 of collet lock 220 pushes sections 208 of collet 202 radially outwardly against inner wall 215 of replaceable horn tip 201 thus securing replaceable horn tip 201 on collet 202 and to ultrasonic collet horn 200.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An ultrasonic collet horn for an ultrasonic welder, comprising:
   a body;
   a collet over which a replaceable horn tip is receivable, the collet projecting outwardly at an end of the body of the ultrasonic collet horn, the collet having a plurality of axial slits therein that divide the collet into sections and a tapered axially extending bore that tapers outwardly as it extends axially outwardly; and
   the body having a threaded bore that is threadably engageable with a threaded inner section of a collet lock, the threaded bore extending extends axially inwardly from an axial inner end of the tapered axially extending bore;
   the sections of the collet being forced outwardly against an inner wall of the horn tip when the horn tip is received on the collet and the collet lock tightened into the threaded bore to secure the horn tip on the collet.

2. The ultrasonic collet horn of claim 1, wherein the collet has a polygonal cross-section with chamfered edges split by the axial slits.

3. The ultrasonic collet horn of claim 1, wherein the collet has a generally square cross-section with chamfered edges split by the axial slits.

4. The ultrasonic collet horn of claim 1 and further including the collet lock, the collet lock having a tapered outer section that forces the sections of the collet against the horn tip when the threaded inner section of the collet lock is tightened in the threaded bore.

5. The ultrasonic collet horn of claim 4 wherein the threaded inner section of the collet lock is a threaded shaft.

* * * * *